(No Model.)
G. B. DAVIS.
ELEVATED CARRIER.
No. 521,309. Patented June 12, 1894.
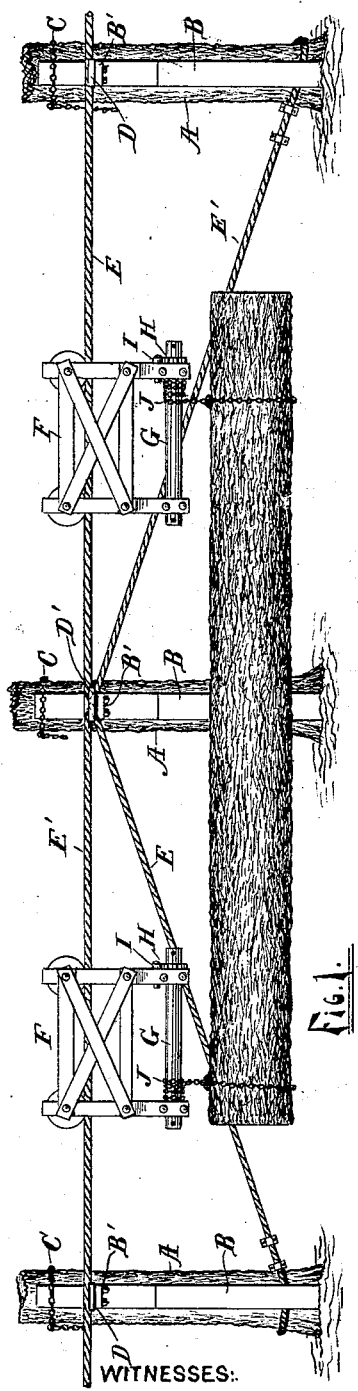
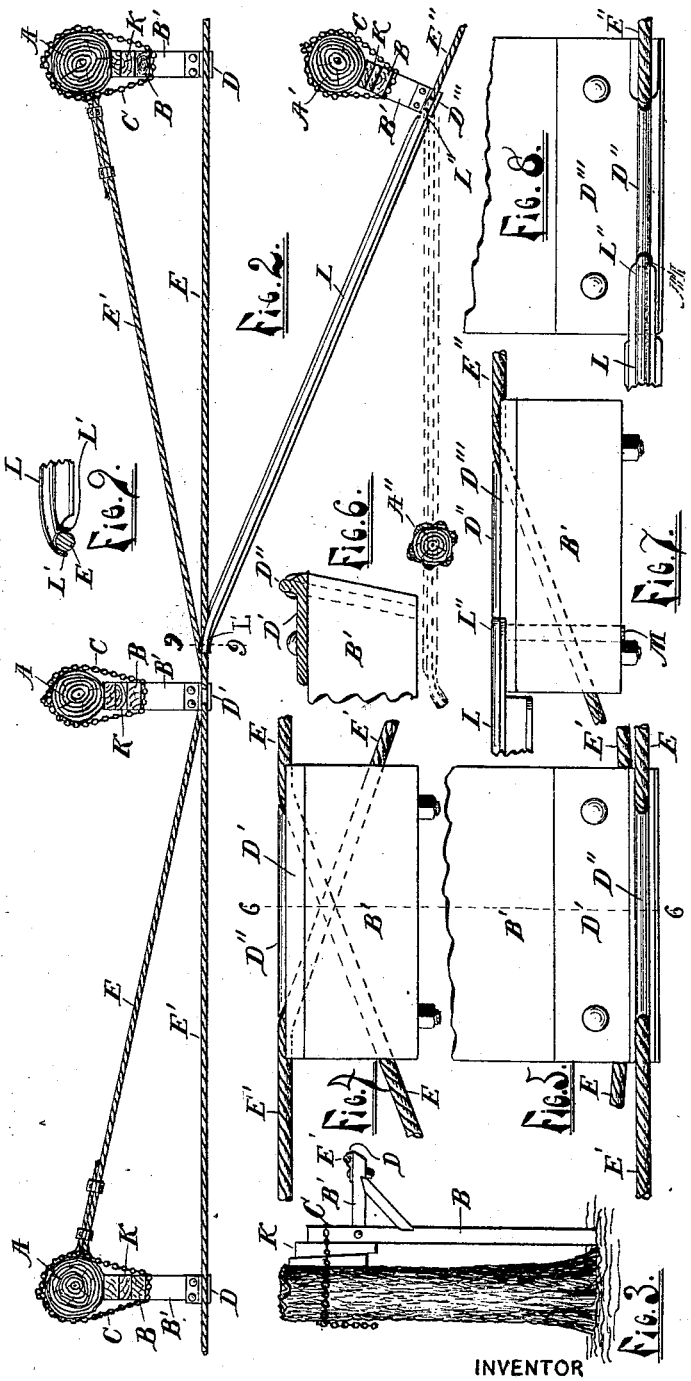
WITNESSES:
INVENTOR
Giles B. Davis
BY
Luther V. Moulton
ATTORNEY.

UNITED STATES PATENT OFFICE.

GILES BRADFORD DAVIS, OF WHITE CLOUD, MICHIGAN.

ELEVATED CARRIER.

SPECIFICATION forming part of Letters Patent No. 521,309, dated June 12, 1894.

Application filed August 30, 1893. Serial No. 484,410. (No model.)

*To all whom it may concern:*

Be it known that I, GILES BRADFORD DAVIS, a citizen of the United States, residing at White Cloud, in the county of Newaygo and State of Michigan, have invented certain new and useful Improvements in Elevated Carriers; and I do hereby declare the following to be a full, clear, and exact description of the invention, such as will enable others skilled in the art to which it appertains to make and use the same.

My invention relates to improvements in elevated carriers, and more particularly to such consisting essentially of an elevated track, consisting of a cable and carriages running thereon, and adapted to convey saw logs and other timber and its object is to provide the same with certain new and useful features, hereinafter more fully described, and particularly pointed out in the claims, reference being had to the accompanying drawings, in which—

Figure 1 is a side elevation of a device embodying my invention. Fig. 2 is a plan view of the same; Fig. 3 a side view of cable support; Fig. 4 a front elevation of support block at the junction of the various sections; Fig. 5 a plan view of the same; Fig. 6, a section of supports on line 6—6 of Figs. 4 and 5; Fig. 7 a detail of switch support in elevation; Fig. 8 a plan of the same; and Fig. 9, a section of the movable end of switch rail on the line 9—9 of Fig. 2.

Like letters refer to like parts in all of the figures.

A, A, A, represent any convenient series of trees or posts, to which are secured posts B, by means of chains or other suitable fastenings C. These chains are tightened by wedges K driven between said posts and trees and the lower ends of said posts rest on the ground and are pressed inward against said trees by the downward pressure of the cables E, E', which cables are supported by arms B', extending horizontally from said posts. Said cables rest in grooved metal blocks D, bolted or otherwise secured to the outer end of said arms B'. To avoid undue sagging of the cables, as is the case when used in great lengths, they are at frequent intervals divided into detached sections as E and E', which sections are oppositely extended and independently anchored to any suitable trees or posts. Each section can thus be made short and will sag but little under the load, as a consequence. To provide a continuous line, or track at the intersection of these sections, I provide a metal block D', with a groove for a short distance only at each end thereof, these grooves terminating in downwardly and inwardly inclined openings, through which the respective cables pass, said cables being extended through suitable openings in the arm B', and thence to the respective anchorages. Between said openings in the metal block, is an elevated rib D', having a rounded upper surface, conforming to and in line with the upper surface of the respective cable sections E and E'. Traversing this way I provide the carriages F, having at the upper sides grooved wheels running on said cables, and at their lower sides the windlasses G, provided with pawls H and ratchets I, upon which windlasses are wound chains J for suspending the logs, or timber to be carried.

For a switch or turnout, I select a tree, or provide a post A' located at a suitable distance from the main line, and from this extends any suitable cable E'' for a side line, which cable is supported at the end by the post B, having an arm B', and suitably supported by said tree or post A', upon which is a metal block D''', which, at the end, which supports the cable E'', is formed the same as the section blocks D'; it also has the middle rib D''', and at the other end is reduced to a plane surface and provided with a vertical opening, in which opening is inserted a pivot pin M, to which is attached the end of a suitable movable rail section L, which latter rests on the plane surface before mentioned and turns on the same. The movable end of the rail is bent to one side, as may be necessary to line with the main line cable when applied thereto, and reduced vertically to substantially a thin concavo-convex wedge L', which is placed with its concave side upon the main line cable. The wheels of the cars F will run off on this rail, and take the side line cable E''.

To open the switch I provide at a suitable point a tree or post A'', to support the rail L and detaching the end L' swing the said rail to, and rest it upon said support at such distance from the main line as to permit the passage of the cars F.

What I claim is—

1. The combination, in an elevated carrier, with supporting posts, arms projecting horizontally therefrom, blocks on the ends of said arms, the block of the intermediate post having openings extending inward and then downward from its opposite ends and formed with an elevated rib between the horizontal parts of said openings and the other of said blocks having horizontal grooves, and independent sections of cables anchored at their ends and extending through said openings in the blocks in the manner described, of supports for said posts, means, connecting said posts and supports, and wedges between said posts and supports, substantially as shown and described.

2. The combination, in an elevated carrier, with the supporting posts, blocks supported by said posts, and the cables engaging said blocks, of supports for the posts, a flexible means connecting said posts and supports, and wedges between said posts and supports, substantially as shown and described.

3. The herein described elevated carrier, comprising, supports, posts, connected with said supports, wedges between said supports and posts, horizontal arms projecting from said posts, blocks on the ends of said horizontal arms, the block of the intermediate arms having openings extending from its opposite ends inward and thence inclinatorily downward, and also having an elevated rib between the horizontal parts of said openings and the other blocks having horizontal grooves, independent sections of cables anchored at their ends and extending through said openings in the blocks, in the manner described, a switch rail having one end adapted to rest upon said cable when in use, a block, having a plane surface to support the opposite end of said switch rail and to which the same is pivoted, a side line cable attached to said last-mentioned block in line with said rail when the latter is engaged with the main line cable, and a support for the first-mentioned end of the switch rail when the latter is not in use, substantially as described.

4. In an elevated carrier, in combination with a cable forming the track or line, supports for the same, consisting of posts having horizontally projecting arms, having grooved metal blocks attached to engage the cable, said posts also resting on the ground at their lower ends and attached to trees, or other suitable supports by chains, and wedges between said posts and trees to tighten said chains, substantially as described.

In testimony whereof I affix my signature in presence of two witnesses.

GILES BRADFORD DAVIS.

Witnesses:
S. M. COFFEY,
L. C. MIDDAUGH.